M. NEIL & W. YOUNG.
Plashed Fence.
No. 208,755. Patented Oct. 8, 1878.
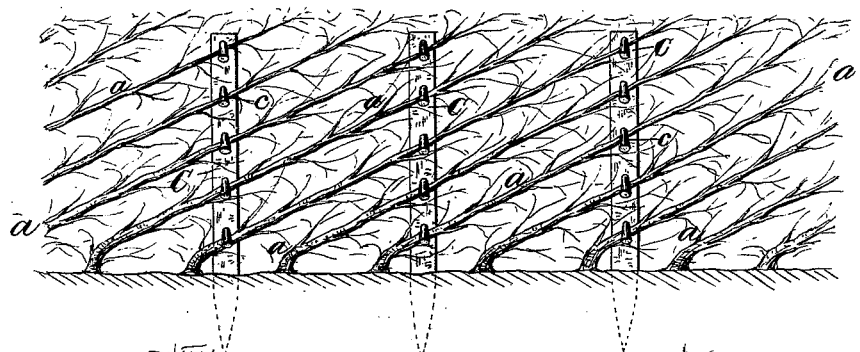
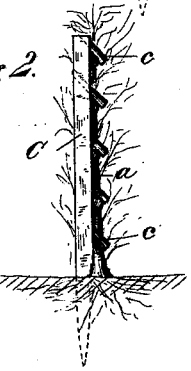 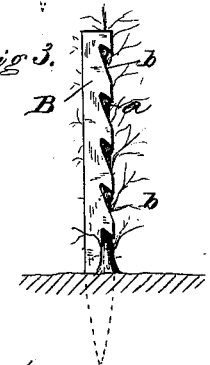
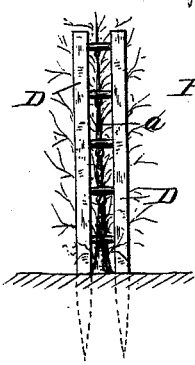 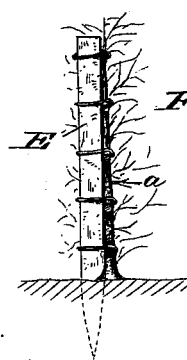
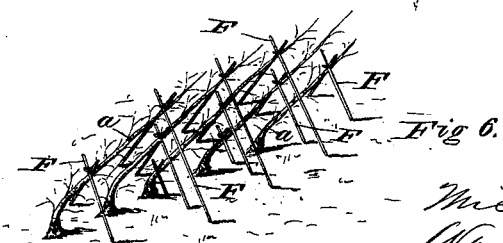
Witnesses.
Harry King
Emanuel Blout
Inventor.
Michael Neil
Wesley Young
M. L. Hice
Their atty.

UNITED STATES PATENT OFFICE.

MICHAEL NEIL, OF DAYTON, AND WESLEY YOUNG, OF COLUMBUS, OHIO.

IMPROVEMENT IN PLASHED FENCES.

Specification forming part of Letters Patent No. 208,755, dated October 8, 1878; application filed August 15, 1878.

*To all whom it may concern:*

Be it known that we, MICHAEL NEIL, of Dayton, in the county of Montgomery and State of Ohio, and WESLEY YOUNG, of Columbus, in the county of Franklin and State of Ohio, have invented a certain new and useful Improvement in Plashed Fences; and we do hereby declare the following to be a full and exact description of the same, reference being had to the accompanying drawings, forming part of this specification, in which—

Figure 1 is a side elevation, and Fig. 2 a vertical cross-section, of a fence plashed by our improved mode. Fig. 3 is a vertical cross-section, showing a modification of the means employed in carrying out the improved mode. Fig. 4 is a similar section, showing another modification. Fig. 5 is a similar section, showing another modification; and Fig. 6 is a perspective view, representing still another modification.

Similar letters of reference in the several figures denote the same parts.

This invention is an improvement upon the old modes of plashing hedges; and it consists in bending the hedge-plants down so that their bodies—or, in other words, the greater portion of their stem from the root upward—will lie parallel, or nearly parallel, to, but separate from, each other and in the vertical plane of the fence, and then securing said bodies or main portions of the stem in said position by fastening them to stakes or their equivalents, the object being that the force which holds the plant down should be applied along the body of the plant, and not merely at or near its top, and that such force should be transmitted from the ground itself, and not from the lower cane or canes of the hedge.

In carrying out the invention, we employ a series of stakes, driven into the ground at such intervals that, as a rule, two or more stakes will come between the root and top of each bent-down cane, which affords us at least one or more points along the main portion of the cane at which the fastenings can be applied. We then fasten the body of each plant to the stake, independently of the bodies of the adjacent plants, so as to keep their bodies or main portions apart, and hold each in place with the proper space between them, and yet permit their free growth. Standing canes or plants at the proper intervals will answer the same purpose as the driven stakes. The bent canes that form the hedge are not to be woven or interlaced with the standing stakes or canes, as that mode injures them more or less, and does not properly fasten or hold them, nor keep them separate from each other along the main portion of their length.

In the drawings, *a a* represent the hedge-plants, bent down at a point at or near the surface of the ground, so as to lie substantially or nearly parallel to each other, one above the other, in the same vertical plane of the fence. Along the line of the fence from point to point we drive into the ground stakes, to which we fasten the bent-down plants in such manner as to preserve substantially their position with relation to each other, the stakes being set so near together that, as a rule, there will be not less than two within the length of each plant. Each stake will therefore extend up beside several bent plants, and we secure each plant to each stake at the points where the plants cross the stakes by means of a fastening which will hold the plants down without materially cutting or injuring them.

Many different fastenings may be applied, of which several forms are shown in the drawings at B C D E F, B representing a stake provided with a vertical series of notches, *b*, by which the plants are held down; C representing an equivalent of B, formed by inserting inclined pins *c* in the stake; D representing two stakes with the pins extending across from one to the other; E representing a stake with flexible cords or wires tied around it and around the plants; and F representing stakes crossed and tied, or not tied, together, but so that the fork or crotch thus formed holds the plant down in place.

The essential requisites of this mode of plashing are, first, that the plants should not be bunched together at their ends, and there fastened to a stake, without other support between such fastening and their lower end; but the bodies or main portions of the plants, from the root upward, throughout the greater portion of their length, should be held separate and independent of, and nearly or quite parallel to, each other by a series of positive fastenings applied to each plant along such body or main portion; and, secondly, that such fastenings should be entirely independent of the hedge itself, and not a growing part thereof, and should be connected with the ground so that the upward draft or spring of the plants will be resisted, not by the lower plants, but by the connection of the fastening to the ground independently of the lower plants. The tops or upper ends of the plants above the body or main portion may be left free, or secured to the hedge in any manner that may be preferred.

Having thus described our invention, we claim as new—

The mode of plashing hedges herein described, consisting, essentially, in bending the plants from a point of flexure at or near the ground down in the vertical plane of the fence, with their bodies or main portions separate from and nearly or quite parallel to each other, and then securing them by means of stakes or the equivalent thereof, the body or main portion of each plant being fastened to or by the stakes independently of the bodies or main portions of the other plants, and by separate fastenings, not a part of the growing hedge, substantially as described.

MICHAEL NEIL.
WESLEY YOUNG.

Witnesses:
JORDAN THOMAS,
GEO. M. YOUNG.